United States Patent
Pelizzo et al.

(10) Patent No.: US 7,947,962 B2
(45) Date of Patent: May 24, 2011

(54) RADIOMETER WITH SPECTRAL RESPONSE EQUIVALENT TO THE ERYTHEMA ACTION CURVE CIE, FOR MEASURING THE TOTAL EFFECTIVE IRRADIANCE

(75) Inventors: Maria-Guglielmina Pelizzo, Padua (IT); Piergiorgio Nicolosi, Legnaro (IT); Paolo Ceccherini, Padua (IT)

(73) Assignee: Consiglio Nazionale Delle Ricerche-INFM Instituto Nazionale per La Fisuca Della Materia, Genoa (IT)

( * ) Notice: Subject to any disclaimer, the term of this patent is extended or adjusted under 35 U.S.C. 154(b) by 654 days.

(21) Appl. No.: 11/918,314

(22) PCT Filed: Apr. 11, 2006

(86) PCT No.: PCT/IB2006/000848
§ 371 (c)(1),
(2), (4) Date: Oct. 12, 2007

(87) PCT Pub. No.: WO2006/109140
PCT Pub. Date: Oct. 19, 2006

(65) Prior Publication Data
US 2009/0218504 A1    Sep. 3, 2009

(30) Foreign Application Priority Data
Apr. 14, 2005   (IT) .............................. TO2005A0249

(51) Int. Cl.
*G01J 1/42* (2006.01)
(52) U.S. Cl. ...................................................... 250/372
(58) Field of Classification Search .................. 250/372, 250/474.1, 482.1, 252.1
See application file for complete search history.

(56) References Cited

U.S. PATENT DOCUMENTS

| 4,763,011 | A | * | 8/1988 | Smith ........................... 250/372 |
| 5,837,894 | A | | 11/1998 | Fritz et al. |
| 6,392,239 | B1 | | 5/2002 | Kuklinski |
| 6,426,503 | B1 | | 7/2002 | Wüest |
| 6,822,789 | B2 | | 11/2004 | Kuklinski |

FOREIGN PATENT DOCUMENTS

WO   WO-2005/015138 A1   2/2005

OTHER PUBLICATIONS

R. Vlastou et al., "Characterization of optical UV filters using Rutherford backscattering spectroscopy," Nuclear Instruments and Methods in Physics Research, Section-B: Beam Interactions with Materials and Atoms, vol. 161-163, Mar. 2000, pp. 590-594.

A. F. McKinlay et al., "A reference action spectrum for the unltraviolet induced erythema in human skin", CIE, Journal, vol. 6, No. 1, 1987, p. 17-22.

British Standard (2003) The European Standard EN 60335-2-27, "Household and Similar Electrical Appliances Safety Part 2-27: Particular Requirements for Appliances for Skin Exposure to Ultraviolet and Infrared Radiation".

* cited by examiner

*Primary Examiner* — David P Porta
*Assistant Examiner* — Faye Boosalis
(74) *Attorney, Agent, or Firm* — Venable LLP; Michael A. Sartori; Michael E. Nelson

(57) ABSTRACT

A radiometer for measuring the total effective UV radiance of the type comprising, in an optical pathway sequence, a diffuser, an interference filter and a detector. Said interference filter comprises a plurality of alternating layers of magnesium fluoride and zirconium oxide, where the diffuser/interference filter/detector system has a spectral response equivalent to the erythema action curve CIE.

4 Claims, 4 Drawing Sheets

Figure 1:
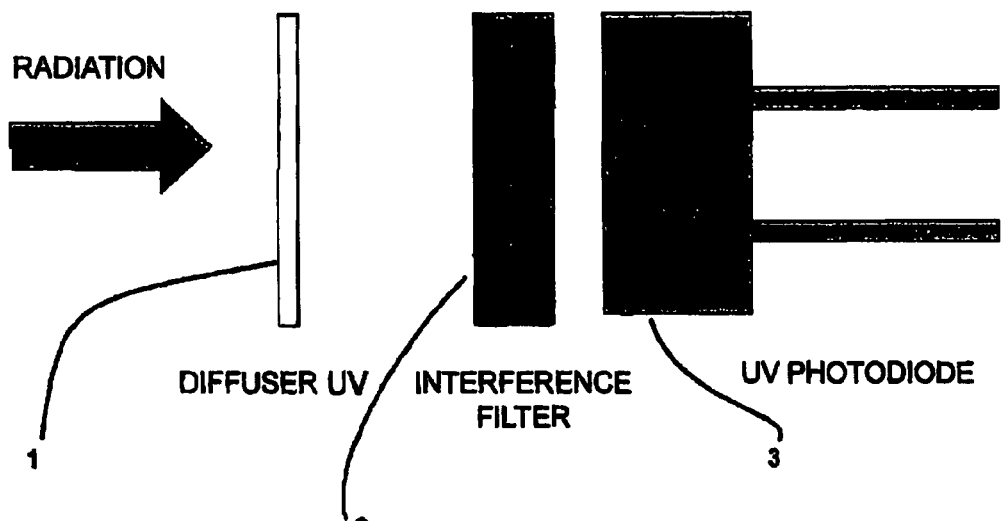

RADIOMETER WITH SPECTRAL RESPONSE EQUIVALENT TO THE ERYTHEMA ACTION CURVE CIE, FOR MEASURING THE TOTAL EFFECTIVE IRRADIANCE

The present invention relates to an optical sensor, suitable to simulate the action curve of the human skin erythema and a radiometer comprising the same, suitable to measure the total effective irradiance of UV sources.

It is known that a prolonged and excessive exposure to UV radiation causes the skin ageing process, can help the onset of skin erythemas, burns and skin neoplastic forms.

The European Standard EN60335-2-27 and the corresponding Italian Standard CEI EN60335-2-27 ("Safety of electric household and similar appliances", part 2, "Particular provisions for household and similar appliances for skin treatment with ultraviolet radiation"), in force from May 1, 1998, deal with the toxicity of appliances with ultraviolet emission (250-400 nm), and set the threshold levels at which a human being can be exposed.

This regulation also explicitly contemplates the tanning appliances for cosmetic use, which are recommended to be used with a maximum effective exposure dosage of 100 J/m$^2$ for the untanned skin in the first session and a maximum exposure dosage of 15 KJ/m$^2$ per individual per year.

The dosage has to be calculated based on the appliance effective irradiance, which is obtained per each wavelength by means of a weight factor, such as defined by the erythema action curve (CIE Research Note, 1987, "*A reference action spectrum for the ultraviolet induced erythema in human skin*", CIE J.6, 17-22).

Currently, the measurement of the irradiance from a source can be carried out using two types of instruments: spectroradiometers and radiometers.

The spectroradiometer allows measuring the resolved irradiance for each single wavelength. In the case of UV irradiance, the total effective irradiance is then obtained using the weight factor as given by the erythema curve and integrating on the entire spectral range.

However, an accurate measurement which also allows the source appliance to be classified according to the types defined by the above-mentioned CEI EN60335-2-27 standard, can be carried out only by means of double monochromator spectroradiometers, which are very complex and have such a size that they can only be used in a laboratory.

In order to measure the total irradiance of a source, a radiometer is thus preferred, which is considerably less expensive (costs are from ten to one hundred times lower) and user-friendly, such as to be operated even by untrained users.

Various types of radiometers using different sensors are available on the market. The phosphorus-based radiometers, of the Robertson-Berger type, are based on the conversion of ultraviolet light to visible light by means of phosphorus. This instrument can approximate the spectral curve of the erythema in the 280-320 nm region and is thus mainly used for measuring solar UVB irradiance.

One of the main problems occurring with the instruments using phosphorus is that their spectral response strongly varies with the temperature and thus they require a thermal control of the system.

Solutions with GaN sensors coupled with interference filters made of hard oxides have a response that greatly differs from that of the erythema for long wavelengths, where the sensitivity of the GaN photodiodes is very low.

AlGaN photodiodes directly obtained by doping the GaN sensor with Al have been developed in order to simulate the erythema spectral response, but the response actually greatly differs from the nominal one, and they further offer low sensitivity.

Radiometers are also known to use sensors comprising an interference filter and a photodiode; however, their spectral response curves differ from the ones of the skin erythema, particularly in the UVA region where the irradiance from the tanning lamps is the greatest.

A solution providing the coupling of a photodiode and an interference filter is, reported in U.S. Pat. No. 6,426,503, which describes a portable radiometer or dosimeter having the characteristics as set forth in the preamble of claim 1 below, comprising an interference filter which—in the example described—is formed by 75 layers of hafnium, silicon and aluminum oxide, having characteristics of transmission similar to the erythema action curve.

As a detector, the dosimeter uses a SiC, or preferably AlGaN photodiode.

U.S. Pat. No. 6,392,239 describes a system of absorbance and interference filters, the response curve of which approximates with the erythema action curve (Diffey Standard). The materials used for providing the multi-layer interference filter are hafnium oxide, zirconium oxide and silicon oxide.

U.S. Pat. No. 6,822,789 describes a UV radiation-absorbing filter system, which in an embodiment are used along with a system of interference filters—consisting of 38 layers of hafnium oxide and/or zirconium oxide and silicon oxide—in order to modify and increase the spectral transmission characteristics of the matrix.

The object of the present invention is to provide a novel, compact and user-friendly radiometer having a spectral response corresponding to that of the erythema action curve and particularly suitable for providing a measurement of the effective irradiance from UV sources, particularly such as tanning appliances.

In view of this object, the subject of the invention is a radiometer having the characteristics as defined in the claims below.

Further characteristics and advantages of the radiometer according to the invention will be apparent from the detailed description below, with reference to a specific embodiment given by way of non-limiting example.

In the annexed drawings:

FIG. 1 is a schematic representation of the structure of the sensor according to the invention, which essentially consists of a transmission diffuser 1, an interference filter 2 and a photodiode UV 3.

A. DIFFUSER (1)

The diffuser is arranged to collect the radiation from different directions. Particularly, as the radiation from a UV source, such as a tanning bed, comes from every directions, when an irradiance measurement has to be carried out, the instrument inlet optic has to be a Lambert diffuser.

Figure 2:
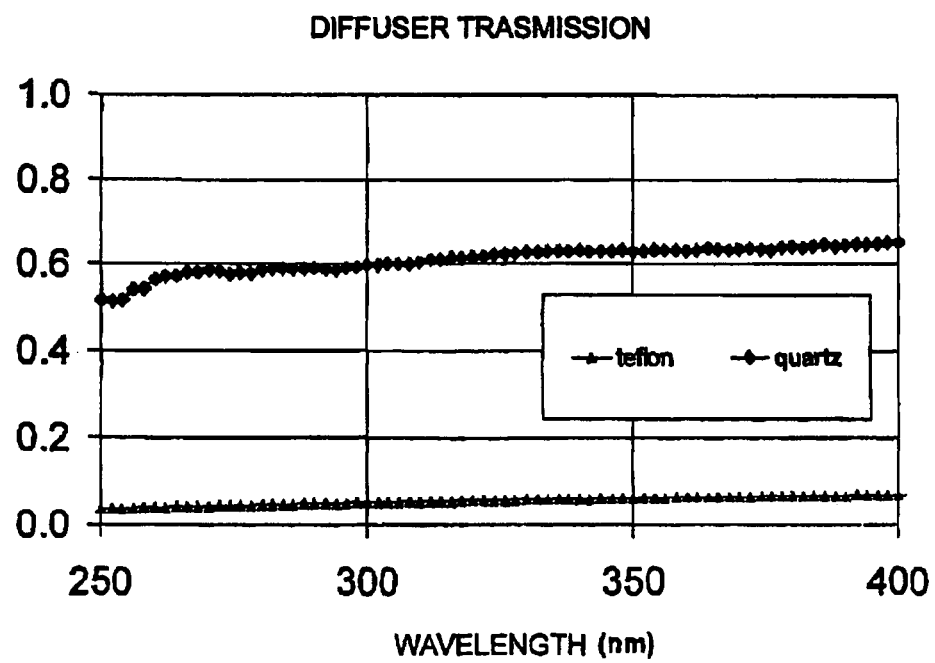

To the purpose, the diffuser can be made of teflon or quartz, which offer different transmission curves. FIG. 2 shows the measured transmission curves of a standard quartz diffuser and of a teflon one having a thickness of 500 micron.

As to the teflon, it provides a response curve which behaves well according to the cosine rule. In this respect, laboratory tests have been carried out by lightning the diffuser with collimated radiation from several angles of incidence and by measuring the transmitted radiation by means of a photodiode. The measure has been then weighed with the cosine of the angle of incidence and compared with the theoretical response curve of an ideal Lambert diffuser.

Figure 2A:
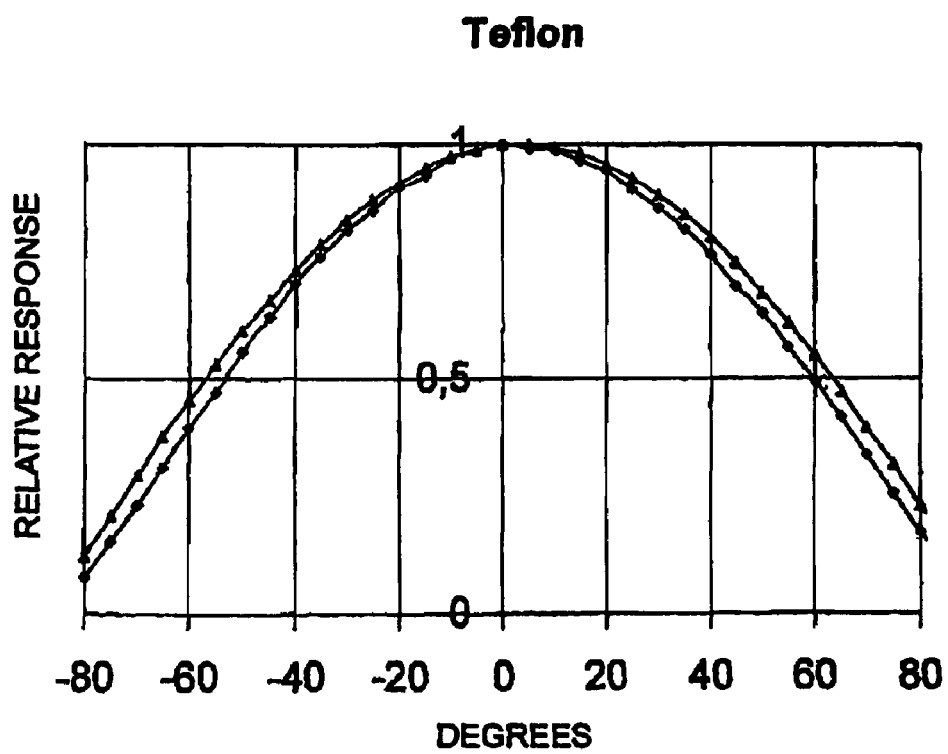

The two normalized curves are illustrated in FIG. 2a, where teflon is seen to behave well up to angles of incidence of 80°. The quartz, on the contrary, may require to be worked in suitable forms.

B. PHOTODIODE (3)

Within the scope of the present invention, a SiC photodiode is preferably used as the detector, which is sensitive in the spectral region of interest (250-400 nm) and blind in the visible and near-infrared and thus does not require to be used in combination with UV bandpass filters. SiC photodiodes are easily available on the market, they are stable at high temperatures and their high Shunt resistance value allows small currents to be detected.

Figure 3:
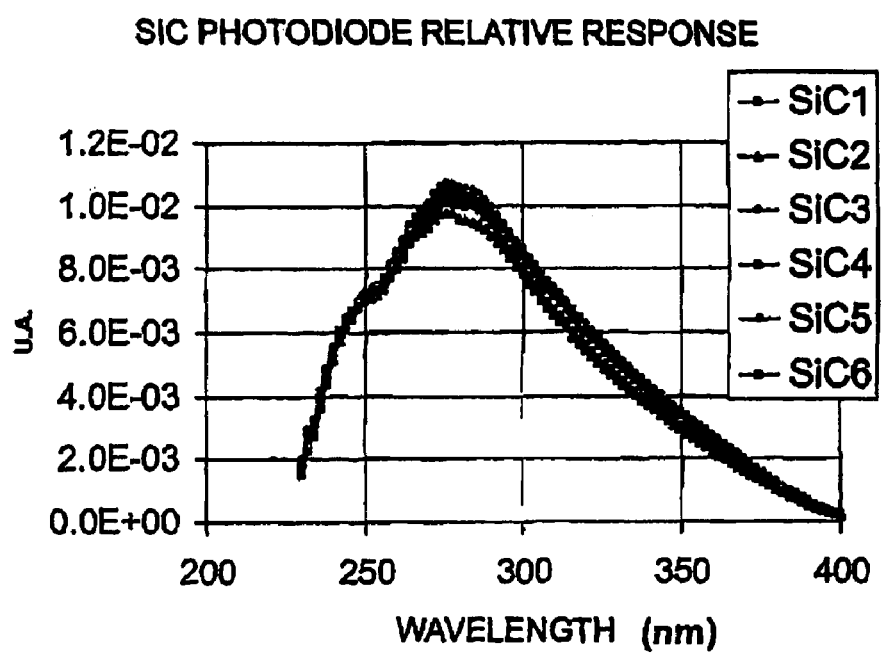

In FIG. 3 there are shown the relative (not absolute) spectral responses that are measured using a halogen lamp as the source and obtained by comparison with a Si photodiode calibrated relative to six SiC commercial photodiodes: as may be seen, the response is similar for all the photodiodes.

Figure 4:
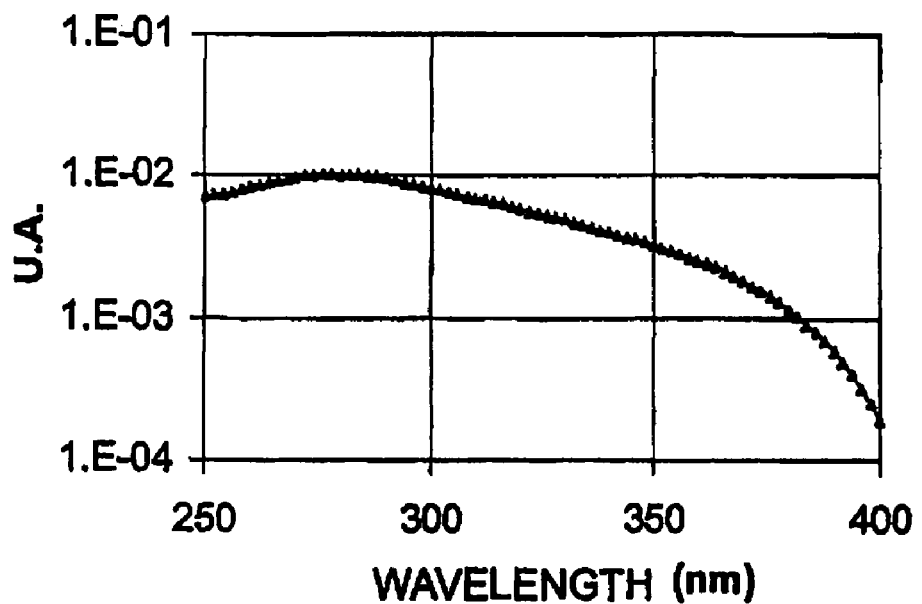

The average relative spectral response of the six spectral responses is reported in FIG. 4. This represents, with a scaling factor less than one, the nominal response curve of the photodiode, preferably used in the sensor according to the invention.

It is understood, however, that the invention should not be considered as being limited to the particular SiC photodiode as described above, as other photodiodes can as well be used, though in a less preferred manner, for example made of GaN or AlGaN.

C. INTERFERENCE FILTER (2)

From the ratio of the nominal erythema action curve to the product between the photodiode spectral response curve and the transmission of the diffuser, it is possible to get the response curve, which the interference filter must have, with a scaling factor less than one.

The scaling factor allows changing the filter peak transmission. To maximize the signal, the filter transmission peak has been defined to be 100%. The filter target curve is reported in FIG. 5.

The filter design can be provided using a commercial software. The filter substrate is preferably UV Graded Fused Silica, a material that transmits in the spectral region of interest in a uniform manner.

Preferably, the filter consists of 30-40 alternating layers of $MgF_2$ and $ZrO_2$.

By way of example, in Table 1 there is reported the filter structure when a SiC photodiode and a quartz diffuser are adopted. The optimum thicknesses can be slightly varied as compared with those reported in Table 1 as they depend on the optical constants of the materials, which can slightly change according to the deposition process employed.

TABLE 1

| # layer | Material | Physical thickness (nm) |
|---|---|---|
| 1 | ZrO2 | 60.40 |
| 2 | MgF2 | 94.38 |
| 3 | ZrO2 | 62.94 |
| 4 | MgF2 | 21.23 |
| 5 | ZrO2 | 73.84 |
| 6 | MgF2 | 34.89 |
| 7 | ZrO2 | 68.47 |
| 8 | MgF2 | 35.38 |
| 9 | ZrO2 | 63.38 |

TABLE 1-continued

| # layer | Material | Physical thickness (nm) |
|---|---|---|
| 10 | MgF2 | 68.69 |
| 11 | ZrO2 | 62.25 |
| 12 | MgF2 | 37.86 |
| 13 | ZrO2 | 57.49 |
| 14 | MgF2 | 61.08 |
| 15 | ZrO2 | 44.13 |
| 16 | MgF2 | 75.79 |
| 17 | ZrO2 | 44.51 |
| 18 | MgF2 | 66.37 |
| 19 | ZrO2 | 38.60 |
| 20 | MgF2 | 70.48 |
| 21 | ZrO2 | 39.18 |
| 22 | MgF2 | 65.47 |
| 23 | ZrO2 | 107.67 |
| 24 | MgF2 | 67.72 |
| 25 | ZrO2 | 39.86 |
| 26 | MgF2 | 68.81 |
| 27 | ZrO2 | 38.15 |
| 28 | MgF2 | 26.88 |
| 29 | ZrO2 | 61.82 |
| 30 | MgF2 | 27.69 |
| 31 | ZrO2 | 111.12 |

Figure 5:
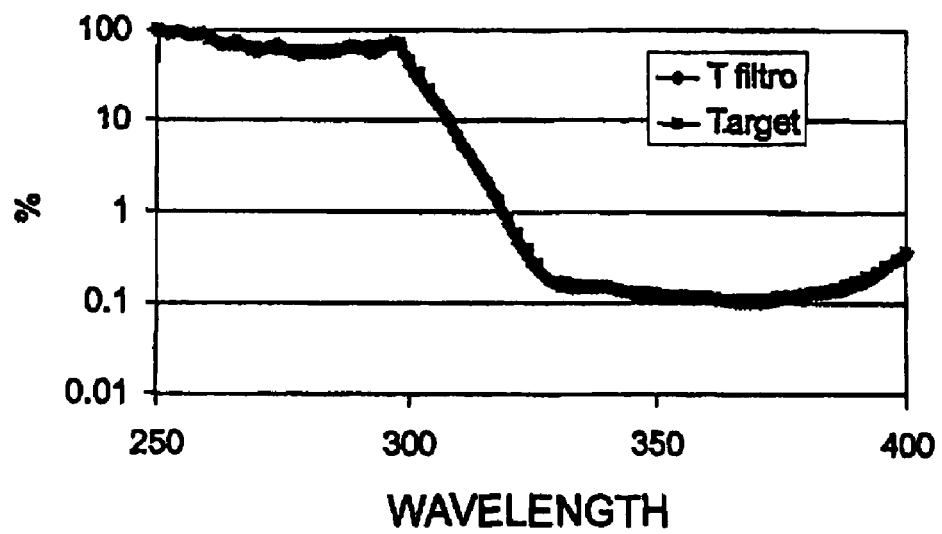

In the above-mentioned FIG. 5, there is also reported the simulation of the filter performance per collimated incident radiation (substrate thickness of 1 mm); as may be seen, the response curve is very proximate to the nominal one.

Figure 6:
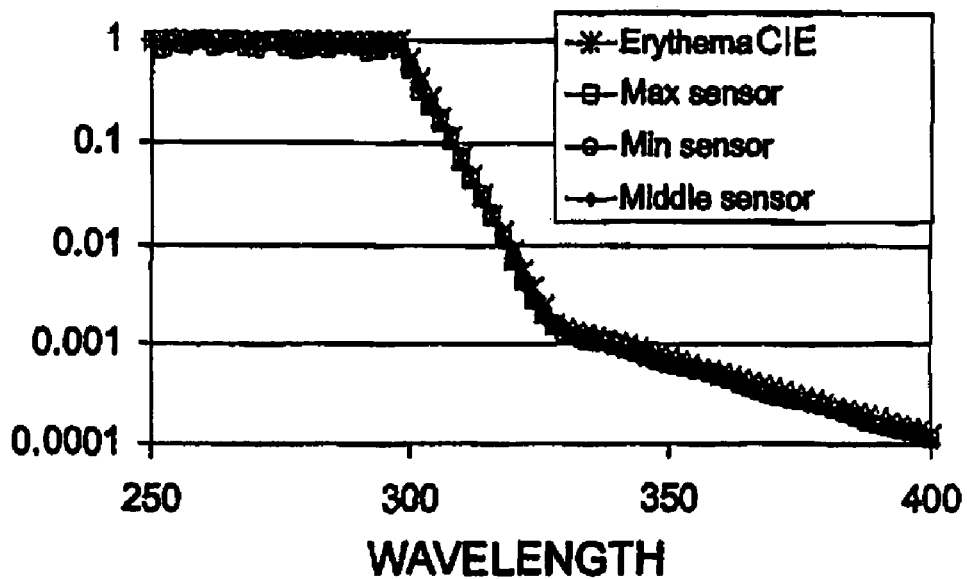

By multiplying the filter transmission curve by the photodiode and diffuser response ones and normalizing the same to its maximum value (or to a more suitable point, which is established during the instrument calibration step) the sensor response curve is obtained, which has to be compared with the erythema action one. In FIG. 6, both curves are reported along with the curves obtained for the photodiodes which greatly diverge from the average curve (FIG. 6—SiC2 and SiC5). It derives that by using any of the measured photodiodes, the sensor maintains a curve very similar to the erythema's one.

Figure 7:
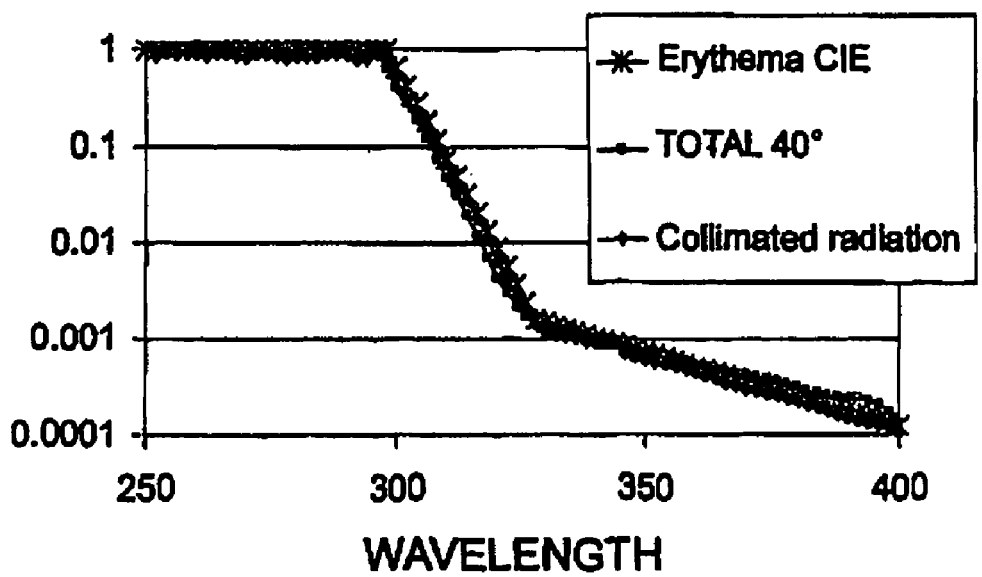

Since the interference filters respond spectrally in a different way to the radiation incident at different angles, an analysis has been carried out relating the solid angle acceptable by the system: the filter and the whole sensor response has been simulated at different acceptance solid angles on the filter. As may be seen in FIG. 7, the performance are fully acceptable for a 40° cone. This defines, downstream of the diffuser, the opening of the filter+photodiode system and guides the mechanical positioning of the filter relative to the diffuser based on the physical dimension of the filter and the insertion of diaphragms before the filter, if required.

D. ESTIMATE OF THE SENSOR QUALITIES

To assess the sensor performance, the effective irradiance of several (high and low pressure) lamps used in a beauty environment with respective filters (filters are inserted in the lamps to the discretion of the manufacturer of the tanning system) has been calculated by multiplying the erythema nominal action curve by the one of the sensor described above.

The curve integrals have been then calculated such as to obtain an estimate of the total effective irradiance in both cases. The relative error occurring with the described sensor is in the order of a few percentages.

Finally, an analysis of the tolerances on the filter thicknesses has been carried out: random variations have been introduced on the physical thickness of the individual layers and the effective irradiation calculations have been repeated using the varied sensor response curves. Tolerances in the order of 1 nm rms on the single layer have resulted to be definitely acceptable.

E. ESTIMATE OF THE SENSOR EFFECTIVENESS

Linearity tests on the photodiode have been carried out, and the same results to be linear in the scale of tens of pA to 4 µA.

To assess the sensor effectiveness, reference has been made to the integral of a lamp effective irradiance curve. The transmission of the diffuser has been estimated as being 5 to 50%, of the filter at the 40% peak, and the sensor response effectiveness has been used as per the specifications.

A 75% flux loss has been further considered, corresponding to an acceptance angular cone of 45°. The currents which are measured by small-sized photodiodes (such as 0.22 mm$^2$) are in the order of nA's. The sensor effectiveness is thus appropriated.

The sensor output value thus directly provides the measure of the total effective irradiance of the source, without requiring a further processing of the measured data.

The sensor described can be for example assembled in an aluminum container; the shape of the probe is preferably cylindrical. The probe is connected by means of a wire to a photocurrent meter. To the purpose, commercial meters can be used, which are already arranged for the effective irradiance values (W/m$^2$) to be visualized on a graphic display when the probe has been calibrated.

The instrument can be provided in an easily portable form and lightweight (<0.5 kg).

The radiometer thus conceived is user-friendly, compact and cost-effective.

In particular, the users are those who have to monitor the skin damage resulting from ultraviolet exposure, in particular solarium owners, manufacturers of tanning lamps and tanning beds.

For example, the exposure conditions can be greatly modified by simply replacing the tanning lamp of an appliance, as lamps of the same type but from different stocks often exhibit different spectral emissions; hence there is the need of frequently monitoring the condition of these appliances.

The use of the sensor can also be extended to monitoring the atmospheric ultraviolet.

It is understood that the sensor or radiometer according to the invention can comprise further accessories, such as a UVB filter (in order to be able to select the 250-320 and 320-400 nm bands in an independent manner).

The invention claimed is:

1. A radiometer for measuring the effective UV irradiance of the type comprising, in an optical pathway sequence, an interference filter and a detector, characterized in that said interference filter comprises 30 to 40 alternating layers of magnesium fluoride and zirconium oxide, and in that said radiometer has a spectral response that does not differ pointwise by more than 20% from an erythema action curve CIE in the range between 250 and 400 nm.

2. The radiometer according to claim 1, characterized in that said detector is a SiC photodiode.

3. The radiometer according to claim 1, characterized in that it further comprises a diffuser and wherein the diffuser/interference filter/detector system has a spectral response equivalent to the erythema action curve CIE.

4. The radiometer according to claim 3, characterized in that said diffuser is a Lambert diffuser made of Teflon or quartz.

* * * * *